2,744,630
Patented May 8, 1956

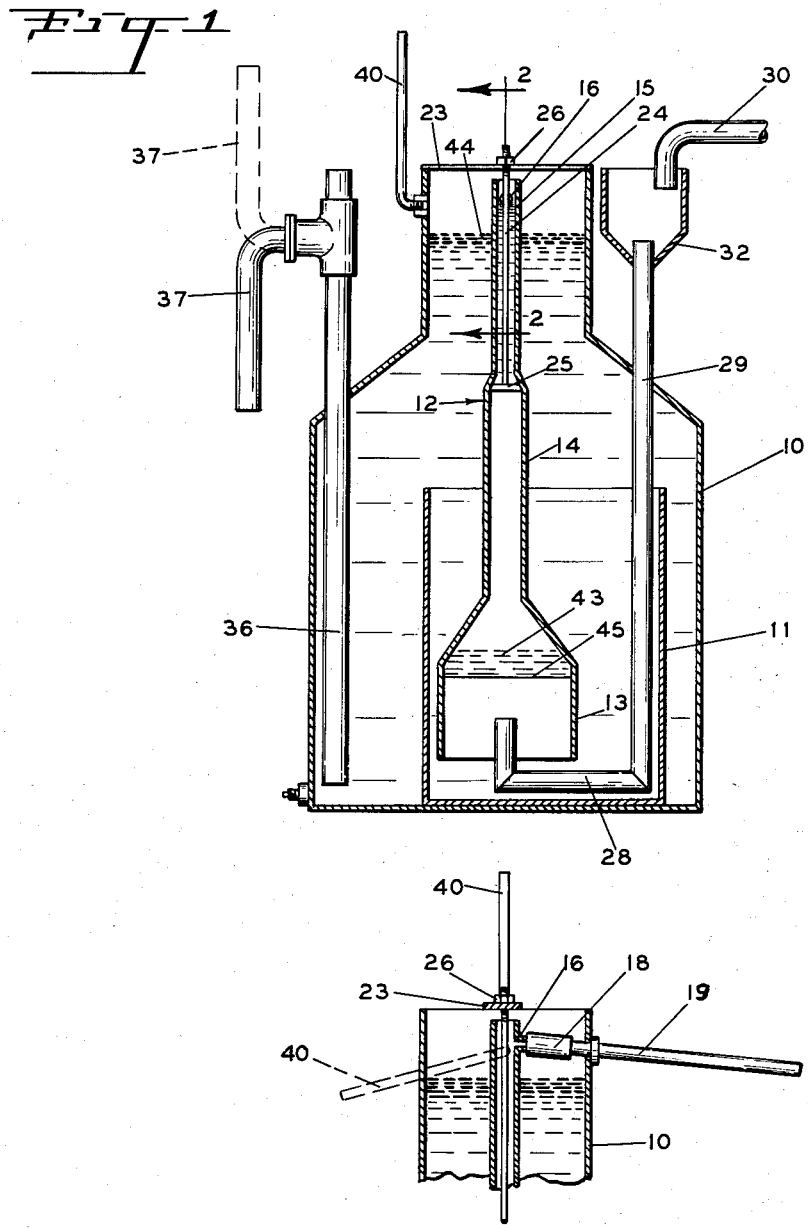

2,744,630
APPARATUS FOR SEPARATING IMMISCIBLE LIQUIDS

Arthur D. Hughes, Corvallis, Oreg.

Application August 10, 1953, Serial No. 373,341

4 Claims. (Cl. 210—56)

The present invention relates to apparatus for effecting a separation of two immiscible liquids, and more particularly relates to apparatus for effecting a separation of mint oil and water obtained from the steam distillation of mint oil containing plants.

Peppermint oil (*Mentha piperita*) is a complex, organic liquid, containing from 50 to 60 per cent menthol and having a specific gravity of approximately 0.90. Peppermint oil is obtained from the mint plant by cutting the plant and, after a short curing period, subjecting the plant to a steam distillation process in a suitable container from which the steam and oil vapors are withdrawn and passed through a condenser and then through a separator.

A principal object of the present invention is to provide apparatus for obtaining an effective separation of the mint oil and water in the condensate from such a process.

More generally, it is an object of the invention to provide apparatus for effecting a separation of any two immiscible liquids having different specific gravities.

More particularly, it is an object of the invention to provide an apparatus for effecting separation of mint oil and water, which apparatus includes means for indicating when the condensate from the steam distillation process is free from mint oil.

Other objects and advantages of the invention will become more apparent hereinafter.

In accordance with an illustrated embodiment, the present invention comprises a vessel or container of relatively large volume in which is mounted a vertically extending separating column open at the bottom and having an outlet adjacent the top of the container. The container is adapted to be substantially filled with the heavier of the liquids to be separated, and means are provided for feeding the mixture of liquids to the separating column wherein the lighter liquid will rise and the heavier sink to flow eventually out of the bottom. Outlet means are provided in the container to permit the continual escape of the heavier liquid therefrom, the outlet means being arranged, however, to maintain a predetermined liquid level in the container outside of the separating column slightly below the outlet of the separating column, the lighter liquid being continuously withdrawn through the last-mentioned outlet.

Certain details of the apparatus incorporate other improved features as will become apparent in the following detailed description of the invention made with reference to the accompanying drawings wherein:

Fig. 1 is a vertical sectional view of a separator embodying the present invention; and Fig. 2 is a fragmentary view showing a detail of the apparatus.

The liquid separating device of the invention comprises a vessel or container 10 which is partitioned or baffled for a portion of its height by means of an open top can 11 disposed therein. Mounted in the container 10 is a vertical, primary separating or collecting column 12, the lower end of which is open and is disposed within the can 11. Preferably the separating column 12 is of relatively large cross-sectional area adjacent its bottom and of progressively smaller cross-section toward the top. In the illustrated embodiment of the invention, the lower end of the separating column comprises a cylindrical section 13 of relatively large cross-sectional area, the column being formed of successive vertical sections 14 and 15 each of progressively smaller cross-sectional area. The uppermost section 15 terminates near the top of the can and is provided with a light liquid outlet 16 (Fig. 2) closely adjacent its top end, which outlet is connected through a flexible coupling 18 preferably formed of a transparent tubing of suitable material to a discharge pipe 19 extending through the side of the container 10. Preferably the column 12 is supported within the container 10 so that the height of the column may be adjusted relative to the container 10. As shown, the column 12 is suspended from a bracket 23 by means of a rod 24 extending downwardly through the column and having a spider 25 on its lower end which engages the neck between the upper section 15 and central section 14 of the column 12. The upper end of the rod 24 is threaded and passes through an enlarged opening in the bracket 23, a nut 26 being provided whereby, by turning the nut, vertical adjustment of the height of the separating column may be obtained.

Means are provided for feeding a mixture of the liquid to be separated to the bottom of the separating column 12, which means comprise a feed line having a lower section 28 extending upwardly into the lower section 13 of the separating column and an upper section 29 extending outwardly of the container 10 and adapted to receive the condensate of mint oil and water escaping from the condensate line 30 of the condenser (not shown). To facilitate the collection of the condensate from the line 30, a funnel is preferably provided on the upper end of the feed line. In that connection it has been found that the provision of an ordinary funnel, that is, one having an inverted conical section leading directly into a tube, is undesirable in that a swirling action is created as the liquids pour out of the funnel, causing air to be drawn into the feed line along with the liquids and which air is passed into the separating column disrupting the separation of the liquids therein. However, it has been found that, by a slight modification of the ordinary funnels, such swirling action can be prevented. Accordingly, in the present invention, a funnel is provided by securing to the upper end of the upper feed line section 29 a collecting member including a lower frusto-conical section 32 which is secured to the feed line a short distance below the upper end thereof whereby the feed line projects into the collecting member above the apex of the frusto-conical section 32, as clearly shown in Fig. 1. It has been found that this structure substantially eliminates any tendency of the liquids to swirl as they pass out of the funnel into the feed line and, consequently, no air is sucked into the feed line to disturb the separation of the light and heavy liquids. Preferably, of course, in the operation of the device, the condensate line 30 is positioned so as to feed its contents in laterally offset relation in respect to the feed line 29, as shown.

Means are provided for removing the heavy liquid from the container comprising an overflow or stand pipe 36 having its inlet adjacent the bottom of the container 10 and outwardly of the can 11. The overflow pipe 36 is completely open throughout its length and extends upwardly to a height substantially equal to the height of the container 10. Provided in the side of the overflow pipe 36 at a predetermined distance below the light liquid outlet 16 of the separating column 12 is an escape outlet for the heavy liquid, to which escape outlet is connected an adjustable conduit or discharge pipe 37 which normally projects downwardly as shown in Fig. 1, but which is swingable vertically to the position shown by the dotted lines in Fig. 1 for a purpose to be explained.

Provided in the side of the container 10 at about the same level as the drain pipe 19 is a secondary drain pipe 40 which is swingable from a normal, upwardly extending position such as shown in Figs. 1 and 2 to a second, downwardly inclined position shown in Fig. 2 in dotted lines for effecting draining of the top portion of the liquid in the container 10.

The operation of the device in the separation of mint oil and water is as follows. The condensate from the condensate line 30 flows through the feed line into the lower portion of the separating column 12 in which the principal or primary separation of the mint oil and water takes place. The mint oil, indicated at 43, rises because of its lower specific gravity, while the water is gradually forced out of the bottom of the separating column 12. The purpose of the partitioning effected by the can 11 is to prevent stratified flow of the water directly from the bottom of the separating column 12 to the inlet of the escape outlet pipe 36 since the water flowing outwardly from the separating column 12 carries with it a small amount of mint oil which would thus be lost through the escape pipe 36. The can 11, however, forces the water escaping from the separating column 12 to rise at least to the top of the can 11, during which time substantially all of the oil initially carried out of the separating column with the water may escape from the water and rise to collect on the upper surface of the water, which oil is indicated in the drawings by the numeral 44. The separated water continually escapes through the overflow pipe 36 and conduit 37 whereby the liquid in the container 10 is maintained substantially constant. It should be noted that the open upper end of the overflow pipe 36 prevents the establishment of a siphoning action through the conduit 37 which, if it occurred, would cause the liquid level in the container 10 to drop to the level of the lower end of the conduit 37.

Since the mint oil has a specific gravity of only about 0.90, the column of oil 43 within the separating column 12 will rise above the level of the water in the container 10 and the oil may escape through the outlet 16, the tube coupling 18 and discharge pipe 19 and be collected in a suitable receptacle (not shown). If desired, however, the discharge pipe 19 and coupling 18 may be omitted and the oil permitted to drop from the outlet 16 upon the upper surface of the water in the container 10, from which it can be drawn off through the secondary drain pipe 40. In either event, it will be evident that with the outlet 16 positioned above the level of the surface of the water in the container 10, the escape of mint oil from the separating column 12 may be observed visually. Thus, when the operator notes that no further oil is escaping from the outlet 16, he will know that the steam distillation of the mint hay is complete.

The purpose of the graduated cross-sectional area of the separating column 12 and its adjustable support in the container 10 is for permitting adjustment of the column so that the interface 45 between the oil and the water is positioned within the lower, larger cross-sectional portion 13 of the column. It is desirable that the interface be at the larger portion of the column, of course, so that the mint oil adjacent the interface will be relatively quiescent and will not have a relatively rapid rate of flow upward as it does have in the upper portion of the column, for such rapid flow would tend to draw with the oil a certain amount of water, thereby decreasing the completeness of the separation.

As mentioned before, a certain amount of the oil escapes with the water from the lower end of the separating column 12 and eventually collects as indicated at 44 on the upper surface of the water in the container 10. This oil is adapted to be drained by means of the secondary drain 40 which may be swung or pivoted to the downwardly inclined position shown in the dotted line Fig. 2 whereby the oil 44 may be drawn off. The purpose of the swingable conduit 37 connected to the outlet of the overflow pipe 36 is to permit raising of the same to its upwardly extending position whereby the escape of water will cease and the level thereof within the container rise so that any mint oil 44 on the top of the water in the container 10 below the level of the secondary drain pipe 40 will be raised so that it may be drawn off therethrough. Moreover, raising of the water in the container 10 will cause the level of the water in the column 12 to rise whereby all of the oil 43 in the column 12 may be collected.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. In a device for separating two immiscible liquids of different densities, a vessel, partition means in said vessel dividing the same into a first and a second compartment, said partition means being of substantially lesser height than the height of said vessel, a vertically extending overflow pipe having an inlet in one of said compartments closely adjacent the bottom thereof and an outlet a predetermined distance above the top of said partition means, a vertical separating column having its lower end disposed near the bottom of the other of said compartments, the upper end thereof terminating above the outlet of said overflow pipe, means supporting said separating column for adjusting its relative vertical position, and a feed pipe opening into the bottom of said separating column.

2. In a device for separating two immiscible liquids of different densities, a vessel, partition means in said vessel dividing the same into a first and a second compartment, said partition means being of substantially lesser height than the height of said vessel, a vertically extending overflow pipe having an inlet in one of said compartments closely adjacent the bottom thereof and an outlet a predetermined distance above the top of said partition means, a vertical collecting column having its lower end disposed near the bottom of the other of said compartments, the upper end thereof terminating above the outlet of said overflow pipe, and a feed pipe opening into the bottom of said collecting column.

3. A device for separating two immiscible liquids of different densities comprising a container, a vertical separating column in said container having an open bottom end and an outlet adjacent the top of said container, means for feeding said liquids to the bottom of said column whereby the lighter thereof rises to said outlet and the heavier thereof flows from the bottom of said column into said container, and means for withdrawing said heavier liquid from said container and for varying the elevation of the liquid level therein comprising a vertical stand pipe communicating with said container adjacent the bottom thereof, said stand pipe extending above said outlet, and an adjustable discharge pipe hingedly connected to said stand pipe in communication therewith at a point below said outlet, said discharge pipe being mounted for swinging movement from a position extending downwardly from said point, whereby said heavier liquid may drain from said stand pipe through said discharge pipe to maintain the liquid level in said container at said point, to a position extending upwardly from said point whereby drainage cannot occur and the liquid level in said container will be elevated, and drain means in the wall of said container above the level of the connection of said discharge pipe to said stand pipe and substantially at the level of said outlet.

4. In a device for separating two immiscible liquids, a container, a vertical separating column in said container having an outlet adjacent the top of said container, means for feeding a mixture of liquids to be separated to the bottom of said column, an overflow pipe communicating with said container near the bottom thereof, said pipe having an outlet positioned slightly below said separating column outlet, adjustable conduit means connected to said overflow pipe for receiving liquid flowing from said pipe outlet, said conduit means being connected for elevation above said overflow pipe outlet whereby to effect elevation of the liquid level in said container, and drain means in the wall of said container above said overflow pipe outlet, said container being of relatively large cross-sectional area adjacent the bottom thereof but being of substantially reduced cross-sectional area adjacent the top thereof, whereby to effect the collection of the lighter separated liquid in a relatively thick layer thus to facilitate drainage of said lighter liquid through said drain means without draining the heavier liquid therethrough.

References Cited in the file of this patent

UNITED STATES PATENTS

| | | |
|---|---|---|
| 411,646 | Dorn et al. | Sept. 24, 1889 |
| 1,147,881 | Morris | July 27, 1915 |
| 1,595,134 | Zimmerman | Aug. 10, 1926 |
| 1,618,151 | Fisher | Feb. 15, 1927 |
| 2,181,685 | Walker | Nov. 28, 1939 |
| 2,319,962 | Walker | May 25, 1943 |
| 2,601,904 | Erwin | July 1, 1952 |

FOREIGN PATENTS

| | | |
|---|---|---|
| 124,551 | Great Britain | Mar. 24, 1919 |
| 174,548 | Great Britain | Feb. 2, 1922 |